United States Patent
Ranganathan et al.

(10) Patent No.: US 8,264,191 B1
(45) Date of Patent: Sep. 11, 2012

(54) LOAD COMMUTATED CURRENT SOURCE INVERTER

(75) Inventors: Vilianguppam Thathachary Ranganathan, Karnataka (IN);
Sowmithri Ranganathan, legal representative, Bangalore (IN);
Debmalya Banerjee, Karnataka (IN)

(73) Assignee: Indian Institute of Science, Bangalore (IN)

( * ) Notice: Subject to any disclaimer, the term of this patent is extended or adjusted under 35 U.S.C. 154(b) by 373 days.

(21) Appl. No.: 12/551,109

(22) Filed: Aug. 31, 2009

(51) Int. Cl.
*H02P 1/26* (2006.01)
(52) U.S. Cl. ........ 318/767; 318/727; 318/768; 318/800; 318/801; 318/802
(58) Field of Classification Search ............. 318/767, 318/727, 768, 800–803
See application file for complete search history.

(56) References Cited

U.S. PATENT DOCUMENTS

| | | | |
|---|---|---|---|
| 3,757,197 A | | 9/1973 | Bailey |
| 4,400,655 A | * | 8/1983 | Curtiss et al. ............ 318/729 |
| 5,504,667 A | * | 4/1996 | Tanaka et al. .............. 363/37 |
| 5,977,660 A | * | 11/1999 | Mandalakas et al. ....... 307/105 |
| 7,990,097 B2 | * | 8/2011 | Cheng et al. ................ 318/800 |

OTHER PUBLICATIONS

Singh, B., et al., "Real time DSP based implementation of a new control method ofactive power filter," Canadian Conference on Electrical and Computer Engineering, IEEE vol. 2, pp. 794-797, May 24-28, 1998.
Bendre. A. et al., "A current source PWM inverter with actively commutated SCRs," Transactions on Power Electronics, IEEE, vol. 17 (4), pp. 461-468, Jul. 2002.

* cited by examiner

*Primary Examiner* — Walter Benson
*Assistant Examiner* — David Luo
(74) *Attorney, Agent, or Firm* — McDonnell Boehnen Hulbert & Berghoff LLP

(57) ABSTRACT

A motor drive system using a current source inverter (CSI) for providing the main power and an active filter for providing the reactive power and harmonics is disclosed. The CSI can be a load-commutated inverter (LCI) build using silicon-controlled rectifiers (SCRs), while the active filter can be based on a voltage-controlled inverter. An LCI circuit comprising of SCRs, wherein CSI is autosequentially turned off is provided. In other words, the negative voltage for turning the SCR off is not load dependent. A control scheme for operating the motor drive system through proper control of the SCRs in the LCI circuit is also provided. As presented, the motor drive system is able to feed medium to high voltage motors using a simple circuit, such that low-frequency torque pulsations are eliminated.

18 Claims, 3 Drawing Sheets

LOAD COMMUTATED CURRENT SOURCE INVERTER

BACKGROUND

Current-source inverters (CSIs) have been an attractive solution for high-power motor drives. Traditionally, CSIs have been implemented using thyristors, which are solid-state semiconductor devices with four layers of alternating N-type and P-type material that can act as bistable switches. A common challenge when designing circuits using thyristors is that typical thyristors are not fully controllable. In other words, after a typical thyristor is turned on by a gate signal, the thyristor remains on until a turn-off condition occurs. The turn-off condition may be the application of a reverse voltage to the terminals, or when the current through the thyristor falls below a threshold holding current.

A gate turn-off thyristor (GTO) is a special type of fully controllable high-power thyristor, which can be turned on or off by a gate signal. A GTO can be turned on by providing a positive current between the gate and cathode of the device, and likewise can be turned off by providing a negative current across the same terminals. As such, GTOs have been a popular choice for thyristor circuit applications such as CSIs.

However, current implementations of CSIs using GTOs suffer from drawbacks such as low-frequency torque pulsation, harmonic heating, and unstable operation at low speeds. Additional tuning for GTOs such as that of pulse width modulation present other issues such as insulation failure, bearing currents, common-mode voltages and over-voltages due to long cables.

SUMMARY

Embodiments of motor drive systems are provided. In one embodiment, the motor drive system includes a motor drive terminal, a current-source inverter, and an active filter, wherein the current source inverter provides the main portion of the power to the motor drive terminal and the active filter functions as a harmonic and reactive compensator. In further embodiment, the current-source inverter is a load commutated inverter, and the active filter is a voltage-source inverter. In another embodiment, the current-source inverter load commutated inverter has a switching frequency in the range of 0 to 60 Hertz and the voltage-source inverter has a switching frequency in the range of 5 to 10 kilo-Hertz. In yet another embodiment, the current-source inverter is implemented using silicon-controlled rectifier devices and the active filter provides the main portion of the power to the motor drive when a motor drive voltage of the motor terminal is not high enough for load commutation.

Embodiments of current-source inverter circuits are also provided. One embodiment of a current-source inverter circuit includes a direct current source, a reference current, a first silicon-controlled rectifier connected in series with a second silicon-controlled rectifier, wherein a cathode of the first silicon-controlled rectifier is connected to an anode of the second-silicon-controlled rectifier at a first node, and a third silicon-controlled rectifier connected in series with a fourth silicon-controlled rectifier, wherein a cathode of the third silicon-controlled rectifier is connected to an anode of the second silicon-controlled rectifier at a second node, wherein the anodes of the first and third silicon-controlled rectifiers are coupled to the direct current source, wherein the cathodes of the second and fourth silicon-controlled rectifiers are coupled to the reference current, and wherein switching on the third silicon-controlled rectifier results in the switching off of the first silicon-controlled rectifier. In another embodiment, the current source inverter circuit further comprises a fifth silicon-controlled rectifier connected in series with a sixth silicon-controlled rectifier wherein the cathode of the fifth silicon-controlled rectifier is connected to the anode of the sixth silicon-controlled rectifier at a third node wherein the anode of the fifth silicon-controlled rectifier is coupled to the direct current source and the cathode of the sixth silicon-controlled rectifier is coupled to the reference current and wherein the first node, second node and third node provide a three-phase input signal to a motor.

An embodiment of a control system for controlling the operations of a motor drive system is also provided. The control system includes an estimator for calculating estimated magnitudes and positions of a rotor flux of an induction motor based on signals from a motor terminal of a motor drive system, a speed control for providing a first motor current information based on signals received from the estimator, a flux control for providing a second motor current information based on signals received from the estimator, a current reference generator for providing reference current information based on signals received from the motor terminal, the speed control, the flux control, and the estimator, an active filter current control for providing active filter control information based on signals from the motor terminal and the estimator, a VSI in-phase sine triangle pulsewidth modulator (IP-SPWM) for controlling transistors in an active filter in the motor drive system based on signals received from the active filter current control, a DC control for providing DC control information based on signals from a DC link inductor in the motor drive system and signals received from the current reference generator, a CSI gate for controlling a current source inverter in the motor drive system based on signals received from the reference current generator, and a rectifier gate for controlling thyristors in an inverter in the motor drive system based on signals received from the DC control.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The embodiments will be further elucidated by means of the following description and the appended drawings.

DETAILED DESCRIPTION

Figure 1:
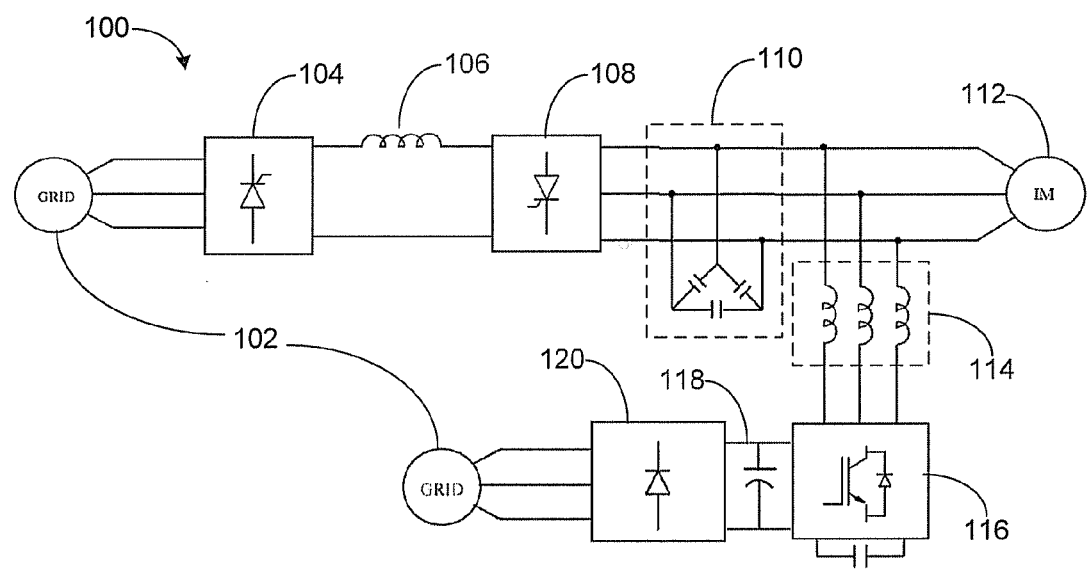
FIG. 1 is an illustrative block diagram of a motor drive system, according to an embodiment of the present application.

FIG. 1 is an illustrative block diagram of a motor drive system 100, including a current source inverter (CSI) 108 and an active filter 116, which replaces bulky AC capacitors. The motor drive system 100 may be used to drive an induction motor. In one embodiment, the CSI 108 may be a load-commutated inverter (LCI), and the active filter 116 may be a current-controlled voltage-source inverter (VSI). The CSI 108 is designed to operate as the main power feed to the motor drive system 100. On the other hand, the current-controlled VSI is connected as a shunt and is designed to supply the required voltage-ampere reactive power and harmonics of the motor drive system 100. In one embodiment, the motor drive system 100 can be adapted to applications presently utilizing GTO-based CSI-fed induction motor drive systems, such as pumps and fans.

The CSI 108 is coupled to a motor terminal 112 via a capacitor bank 110, and is powered by a power supply 102 via a DC link inductor 106 and a phase-controlled rectifier 104. The capacitor bank 110, which may be between 0.05 and 0.1 pu, can be used to absorb some of the high-frequency current components beyond the bandwidth of the active filter 116, produced by the CSI. In one embodiment, the power supply 102 may be a three-phase power supply and the phase-controlled rectifier may be a current-regulated thyristor-based phase-controlled rectifier. Accordingly, the DC link inductor 106 acts as a choke inductor. In one embodiment, the switching frequency of the CSI may be the fundamental frequency. In many high power applications the fundamental frequency operating range is 0-60 Hz.

The active filter 116 is coupled to the motor terminal 112 via a set of inductors 114, and is powered by the power supply 102 via a second phase-controlled rectifier 120 and a bus capacitor 118. The set of inductors 114 can be used to control the current of the active filter 116, such that the value of the inductors determine the switching frequency ripple in the currents entering the motor drive system 100. In one embodiment, the switching frequency of the active filter 116 is in the range of 5-10 kHz. In one embodiment wherein the active filter 116 is a VSI, the power rating of the active filter 116 is in the range of 40%-50% of the power rating of the induction motor depending on the power factor of the medium and high induction motors.

Figure 2:
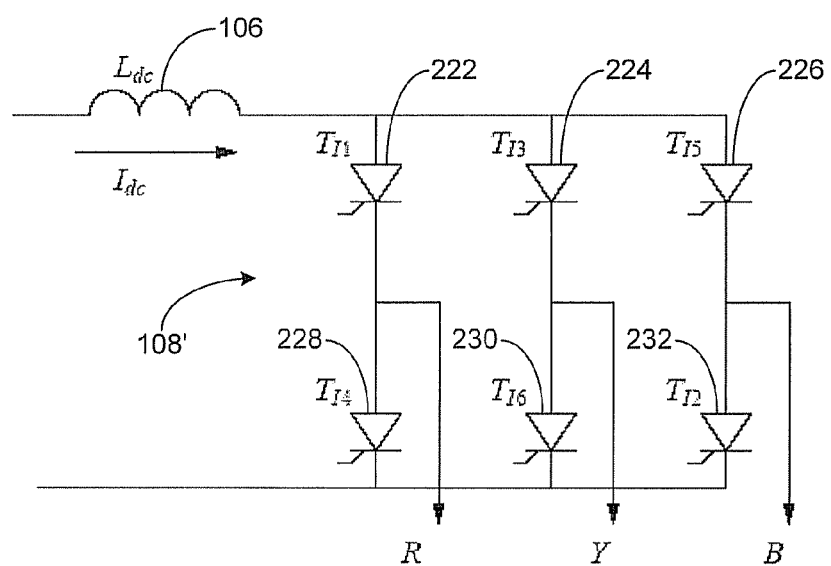
FIG. 2 is a circuit diagram of an LCI 108' that can be used as the CSI 108 in the motor drive system 100 of FIG. 1, according to an embodiment of the present application.

FIG. 2 is a circuit diagram of an LCI 108' that can be used as the CSI 108 in the motor drive system 100 of FIG. 1. LCI 108' includes silicon-controlled rectifiers (SCRs) 222, 224, 226, 228, 230 and 232. The anodes of SCRs 222, 224 and 226 are each coupled to the DC link inductor 106. The cathodes of SCRs 222, 224 and 225 are coupled to the anodes of SCRs 228, 230 and 232 respectively, while the cathodes of SCRs 228, 230 and 232 are coupled to a reference current of the power supply 102 shown in the motor drive system 100 of FIG. 1. The node shared by the cathode of SCR 222 and the anode of SCR 228 provides an output R. Similarly, the nodes shared by the cathode of SCR 224 and the anode of SCR 230 provides an output Y, while the node shared by the cathode of SCR 226 and the anode of SCR 232 provide an output B. The outputs R, Y and B may be used as inputs to a three-phase motor. As mentioned above, the DC link inductor 106 is used as a choke inductor such that only the direct current enters the CSI 108. As will be discussed below, the LCI 108' circuit provides auto-sequential switching off of an SCR.

An SCR is a four-layer semiconducting device that can be used as a switch. SCRs are known to have high voltage ratings of around 4.5 kV (with ratings as high as 6.6 kV) and high current ratings of up to around 3 kA. In contrast, insulated gate bipolar transistors (IGBTs) commonly used in current VSIs are only available with ratings of around 3.3 kV. Nevertheless, SCRs, like most thyristors, can be turned on in a controlled manner, but cannot be turned off on its own. Instead, an external commutation circuit is required to turn the SCR off. As such, a load-commutation circuit must apply a negative voltage across the SCR to turn the SCR off. Further, the time required to turn off the SCR may vary with the load of the load-commutation circuit.

Figure 3:
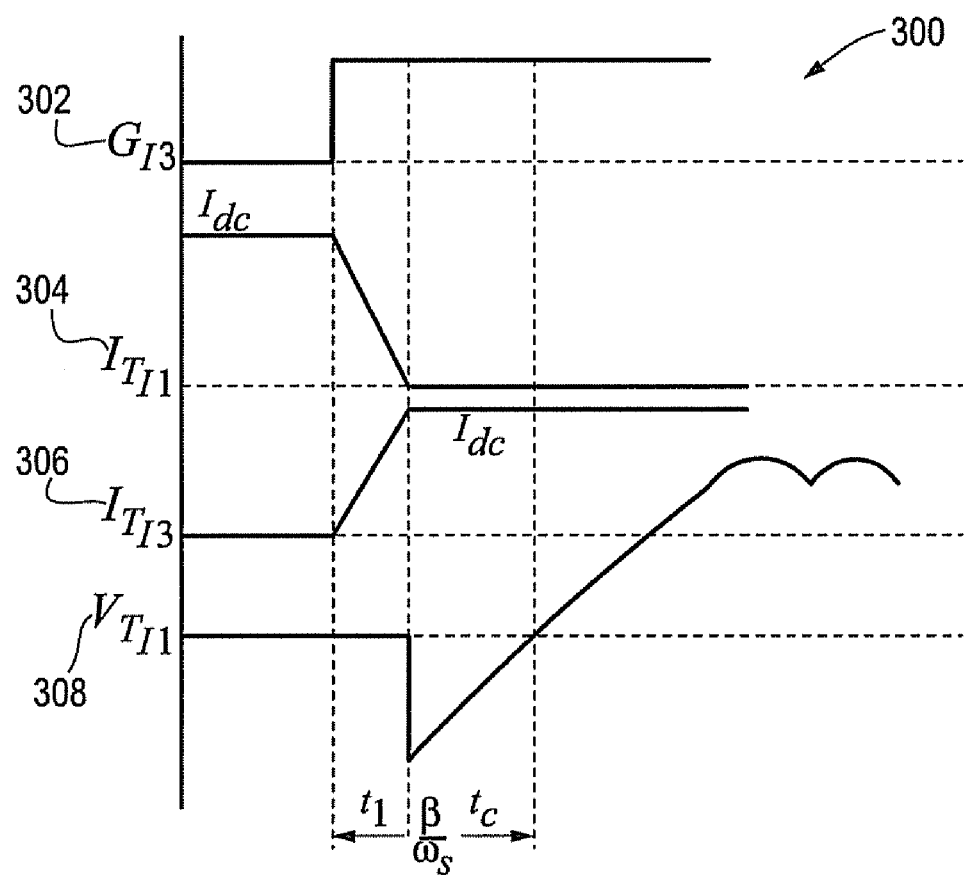
FIG. 3 is a series of waveforms 200 showing the operation of SCR 122 in LCI 108' circuit of FIG. 18.

FIG. 3 is a series of waveforms 300 showing the operation of SCR 222 in LCI 108' circuit of FIG. 2. Included in the series of waveforms 300 is the SCR 224 gate signal 302, SCR 222 current signal 304, the SCR 224 current signal 306 and the SCR 222 voltage signal 308. The waveform begins with SCR 222 turned on and SCR 224 not having been turned on yet. As such, the current signal 304 of SCR 222 is at the DC current level and the voltage signal 308 of SCR 222 is at a reference voltage level. The gate signal 302 of SCR 224 is at an OFF level, while the current signal 305 of SCR 224 is at a reference current level.

In accordance with the LCI 108' circuit of FIG. 2, when the gate signal 302 of SCR 224 switches to an ON level, the current signal 304 of SCR 222 begins to gradually decrease as the current signal 306 of SCR 224 begins to gradually increase. At the time $t_1$, the current signal 304 of SCR 222 has decreased to the reference current level and the current signal 306 of SCR 224 has increased to the DC current level. At this same time $t_1$, the voltage signal 308 of SCR 222 drops to a value negative relative to the reference voltage. This negative voltage value is sufficient to switch the SCR 222 off. To ensure that SCR 222 is turned off, the voltage signal 308 must remain negative for a minimum amount of time $t_c$. The time $t_c$ may be in the range of 250 to 500 microseconds.

As such, implementation of the circuit of LCI' 108 of FIG. 2 as the CSI in the motor drive system 100 of FIG. 1 may provide a number of advantages to over conventional inductor motor drive system circuits using GTOs without having to confront the inability of SCRs to switch off without an asserted OFF signal. One such advantage is the ability to directly feed medium-voltage, high-power motors. Other advantages include simple gate drive circuitry, sinusoidal voltage output to the motor which eliminates issues associate with pulse width modulation, elimination of low-frequency torque pulsation, and the need for bulky capacitors at the output.

In order to optimize the advantage of the LCI 108' circuit of FIG. 2 in the motor drive system 100 of FIG. 1, a system to control the motor drive system is necessary. Fundamentally, the control system for the motor drive system as previously presented involves two main aspects. The first is to control the speed and torque of the induction motor, keeping the motor flux constant. In other words, independent control of motor flux and torque is desired. The second is to control the reactive current and harmonic current injection by the active filter.

To provide a motor drive with sinusoidal voltage and sinusoidal current, injection of harmonic and reactive current by the active filter can be implemented. The active current required by the motor can be controlled by managing the current through the DC link inductor 106 of the motor drive system 100 of FIG. 1. In order to design such a controller, field-oriented control can be employed. In one embodiment, rotor flux orientation is used for decoupling the flux and torque producing currents of the induction motor.

As with most motor drive systems, the motor drive system 100 also uses a special mode of operation to run up the induction motor from standstill. Because the SCRs used in the LCI are load commutated, motor terminal voltages at the motor terminal 112 are used for commutation. At standstill however, the motor terminal voltage is zero. Accordingly, a strategy has been developed to start the induction motor using the current controlled VSI (active filter 116) to accelerate the motor until motor terminal voltages at the motor terminal 112 are high enough for the commutation of the SCRs in the LCI. Once the motor terminal voltages are high enough, the LCI becomes the primary driving force, and the induction motor is accelerated to a rated speed with a rated load fed by both the LCI and VSI. In one embodiment, the motor terminal voltages will be high enough when the frequency of the LCI is around 10 Hz.

Figure 4:
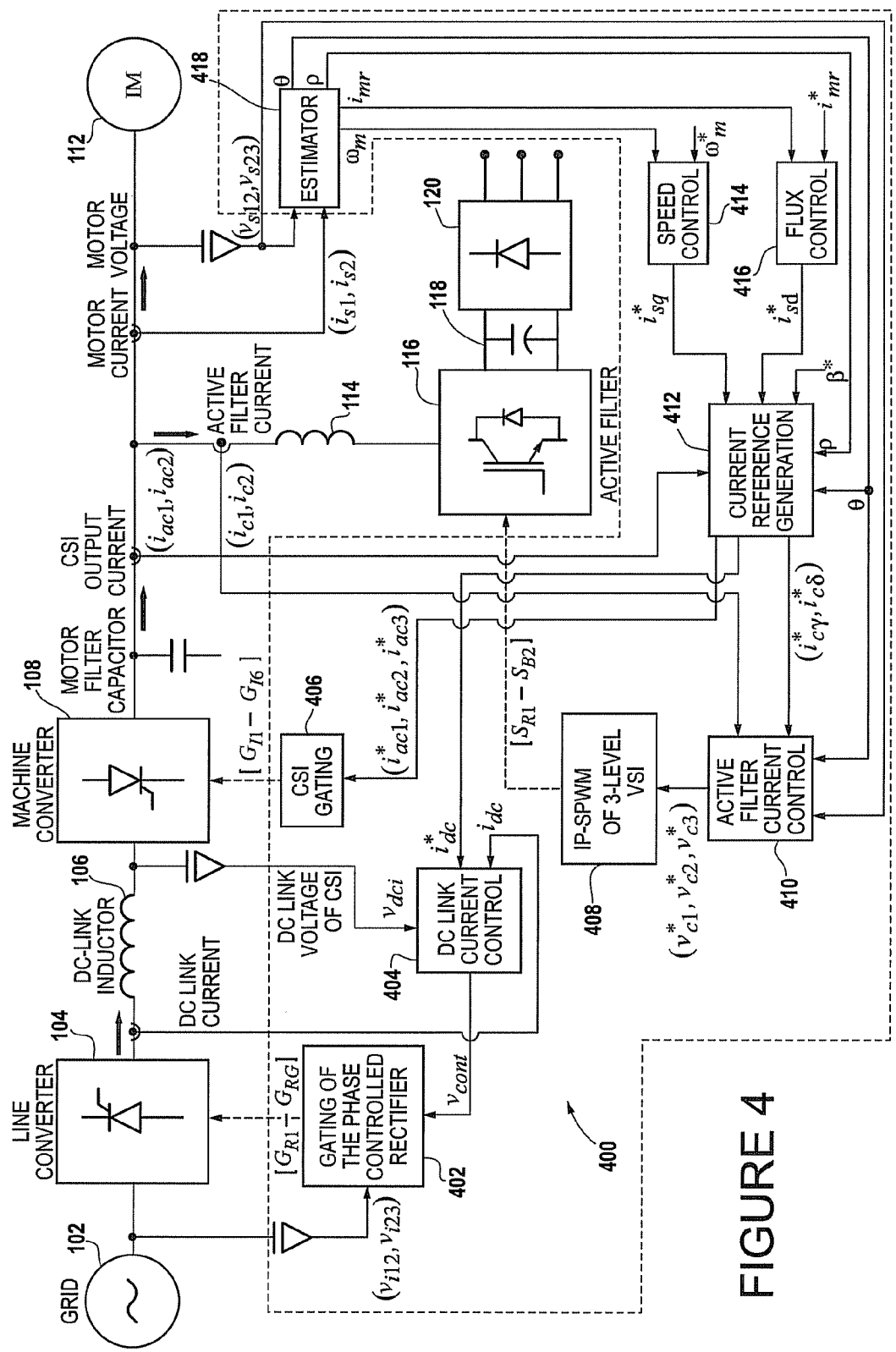
FIG. 4 is an illustrative block diagram of a motor drive system with a dedicated control system, according to an embodiment of the present application.

FIG. 4 is an illustrative block diagram of a motor drive and control system, according to an embodiment of the present application. The motor drive and control system includes the components of the motor drive system 100 of FIG. 1 along with the components of a control system 400. The control system 400 includes a rectifier gate 402, a DC control 404, a CSI gate 406, a VSI in-phase sine triangle pulsewidth modulator (IP-SPWM) 408, an active filter current control 410, a current reference generator 412, a speed control 414, a flux control 416 and an estimator 418.

The rectifier gate 402 receives a buffered input from the power supply 102 and an input from the DC control 404, and provides a control signal to the phase-controlled rectifier 104. The rectifier gate 402 compares the control voltage generated by the DC control 404 with the synchronizing signals generated by the power supply 102. Based on this comparison, the rectifier gate 402 then determines the instants at which the thyristors of the phase-controlled rectifier 104 should be turned on.

The DC control 404 receives an input from the current reference generator 412 as well as inputs from both the ends of the DC link inductor 106, and provides an output to the rectifier gate 402. The DC control 404 is a control loop for ensuring that the current from the DC link inductor 106 follows the desired reference current from the current reference generator 412.

The CSI gate 406 receives an input from the current reference generator 412 and provides a control signal to the CSI 108. Similar to the rectifier gate 402, the CSI gate 406 determines the time instants at which the thyristors of the CSI 108 should be turned on. Instead of comparing voltage signals however, the CSI gate 406 determines the time instants based on references provided as the fundamental component of the current to be generated from the CSI 108.

The IP-SPWM 408 receives an input from the active filter current control 410 and provides a control signal to the active filter 116. The active filter current control 410 receives a buffered voltage input from the motor terminal 112 and voltage phase information from the estimator 418. The IP-SPWM 408 compares the voltage references from the active filter current control 410 against two triangular waves, and based on the comparison, generates gating pulses for the transistors in the active filter 116.

The current reference generator 412 receives a commutation margin angle value $\beta$, inputs from the speed control 414 and the flux control 416, as well as voltage and current phase information from the estimator 418. The current reference generator 412 then provides current information to the CSI gate 406, the DC control 404, and the active filter current control 410.

The speed control 414 receives inductor motor speed information from the estimator 418 and provides current information to the current reference generator 412. The flux control 416 receives motor current information from the estimator 418 and provides current information to the current reference generator 412. As such, the torque producing current is managed by controlling the current through the DC link inductor 106, and the flux producing current of the motor is controlled by managing the reactive current injection by the active filter (VSI) connected at the motor terminal 112 of the motor drive system 100 of FIG. 1A.

The estimator 418 receives motor current and motor voltage information from the input end of the motor terminal and provides motor current and motor voltage information, as well as motor current phase and motor voltage phase information to other components. The estimator 418 estimates the magnitudes and positions of the rotor flux of the motor for the purpose of vector control.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in term's of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A motor drive system, comprising: a motor drive terminal configured to receive a first power portion and a second power portion, wherein the first power portion is larger than the second power portion, and wherein the motor drive terminal is effective to provide a motor terminal voltage; a current-source inverter coupled to the motor drive terminal, wherein the current source inverter is configured to provide the first power portion to the motor drive terminal when the motor terminal voltage is capable of load commutation; and an active filter coupled to the motor drive terminal, wherein the active filter is configured to provide either a startup voltage or a startup current to the motor drive terminal during a startup of the motor drive system, and to provide either a compensating current or a compensating voltage as the second power to the motor drive terminal when the motor terminal voltage is capable of load commutation.

2. The motor drive system of claim 1, wherein the active filter is a voltage-source inverter.

3. The motor drive system of claim 2, wherein the voltage-source inverter has a switching frequency in the range of 5 to 10 kilo-Hertz.

4. The motor drive system of claim 1, wherein the current-source inverter has a switching frequency in the range of 0 to 60 Hertz.

5. The motor drive system of claim 1, wherein the current-source inverter is implemented using silicon-controlled rectifier devices.

6. A current-source inverter circuit for a motor drive system comprising:
a direct current source;
a reference current, wherein the reference current defines a switching signal to control the current-source inverter;
a first silicon-controlled rectifier connected in series with a second silicon-controlled rectifier, wherein a cathode of the first silicon-controlled rectifier is connected to an anode of the second-silicon-controlled rectifier at a first node; and
a third silicon-controlled rectifier connected in series with a fourth silicon-controlled rectifier; wherein a cathode of the third silicon-controlled rectifier is connected to an anode of the second silicon-controlled rectifier at a second node; wherein the anodes of the first and third silicon-controlled rectifiers are coupled to the direct current source; wherein the cathodes of the second and fourth silicon-controlled rectifiers are coupled to the reference current; and wherein switching on the third silicon-controlled rectifier results in the switching off of the first silicon-controlled rectifier.

7. The current-source inverter circuit of claim 6, further comprising a fifth silicon-controlled rectifier connected in series with a sixth silicon-controlled rectifier; wherein the cathode of the fifth silicon-controlled rectifier is connected to the anode of the sixth silicon-controlled rectifier at a third node; wherein the anode of the fifth silicon-controlled rectifier is coupled to the direct current source and the cathode of the sixth silicon-controlled rectifier is coupled to the reference current; and wherein the first node, second node and third node provide a three-phase input signal to a motor.

8. The current-source inverter circuit of claim 6 further comprising a switching frequency in the range of 0 to 60 Hertz.

9. A control system for controlling the operations of a motor drive system, comprising:
an estimator configured to calculate estimated magnitudes and positions of a rotor flux of an induction motor based on signals from a motor terminal of a motor drive system;
a speed control configured to provide first motor current information based on signals received from the estimator;
a flux control configured to provide second motor current information based on signals received from the estimator;
a current reference generator configured to provide reference current information based on signals received from the motor terminal, the speed control, the flux control, and the estimator;
an active filter current control configured to provide active filter control information based on signals from the motor terminal and the estimator;
a VSI in-phase sine triangle pulsewidth modulator (IP-SPWM) configured to control transistors in an active filter in the motor drive system based on signals received from the active filter current control;

a DC control configured to provide DC control information based on signals from a DC link inductor in the motor drive system and signals received from the current reference generator;

a CSI gate configured to control a current-source inverter in the motor drive system based on signals received from the current reference generator; and a rectifier gate configured to control thyristors in an inverter in the motor drive system based on signals received from the DC control.

10. The control system of claim 9, wherein the signals from the motor terminal comprise motor current magnitude, motor current phase, motor voltage magnitude and motor voltage phase.

11. The control system of claim 9, wherein the signals by the current reference generator to provide the reference current information comprise the first motor current information received from the speed control, the second motor current information received from the flux control, motor current phase information received from the estimator, and voltage phase information received from the estimator.

12. The control system of claim 9, wherein the signals by the active filter current control to provide active filter control information comprise the motor voltage information from the motor terminal of the motor drive system and the estimated magnitudes and positions from the estimator.

13. The control system of claim 9, wherein the signals by the IP-SPWM to control transistors in an active filter comprise the active filter control information received from the active filter current control.

14. The control system of claim 9, wherein the signals by the DC control to provide DC control information comprise DC link current information from the DC link inductor in the motor drive system and the reference current information received from the current reference generator.

15. The control system of claim 9, wherein the signals by the CSI gate to control the current source inverter in the motor drive system comprise the reference current information received from the reference current generator.

16. The control system of claim 9, wherein the signals by the rectifier gate to control the thyristors in the inverter in the motor drive system comprise the DC control information received from the DC control.

17. The control system of claim 9, wherein the current source inverter controlled by the CSI gate is configured to provide a main portion of the power to motor drive terminal, and the active control controlled by the IP-SPWM functions as a harmonic and reactive compensator.

18. The control system of claim 17, wherein the active filter controlled by the IP-SPWM is configured to provide the main portion of the power to the motor drive when a motor drive voltage of the is not high enough for load commutation.

* * * * *